UNITED STATES PATENT OFFICE.

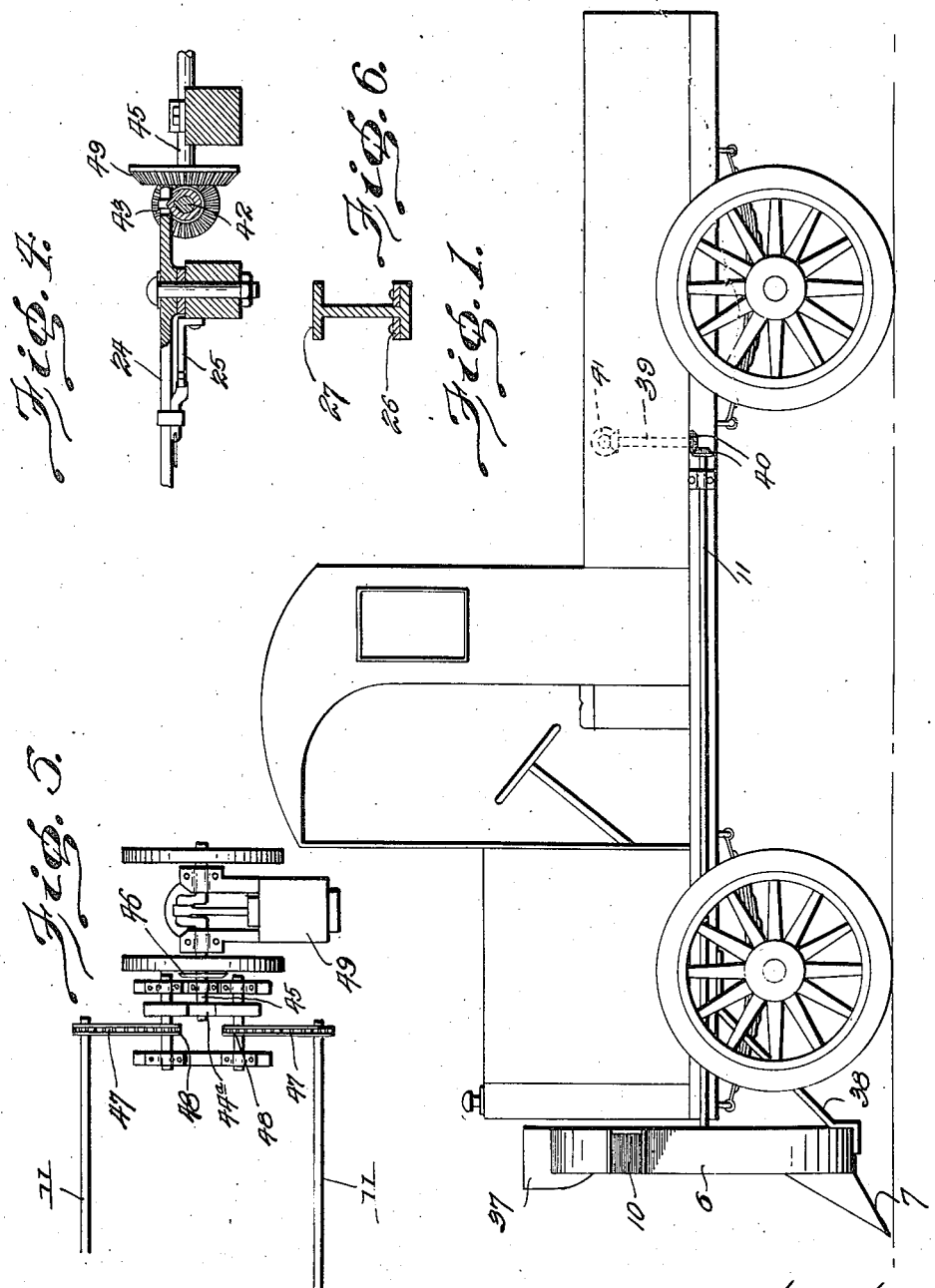

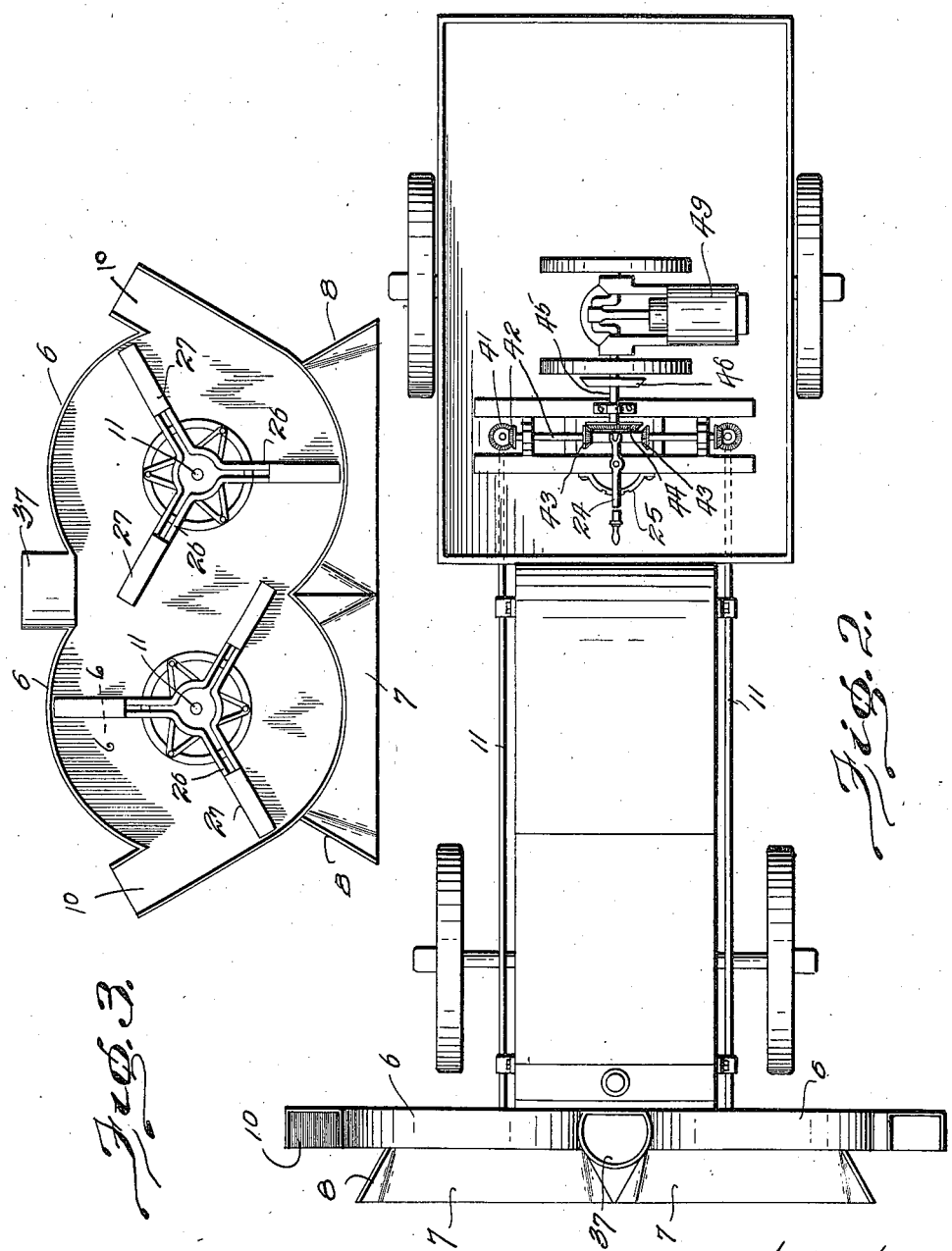

JOSEPH C. CHLADEK, OF MOUNT HOREB, WISCONSIN, ASSIGNOR OF ONE-FOURTH TO ROY A. BEAT AND ONE-FOURTH TO JOHN BEAT, BOTH OF MOUNT HOREB, WISCONSIN.

DUAL ROTARY SNOWPLOW.

1,421,671.            Specification of Letters Patent.      Patented July 4, 1922.

Application filed January 13, 1921. Serial No. 436,927.

*To all whom it may concern:*

Be it known that I, JOSEPH C. CHLADEK, a citizen of the United States, and a resident of Mount Horeb, in the county of Dane and State of Wisconsin, have invented a new and useful Dual Rotary Snowplow, of which the following is a specification.

The object of my invention is to provide a snow plow having a plurality of rotary fans to discharge the snow; and to provide a type of snow plow adapted to be connected with and used on motor driven trucks with an independent power plant. I attain these and other objects of my invention by the novel mechanism illustrated in the accompanying drawing, in which—

Figure 1 is a side elevation of the invention applied to a motor truck;

Fig. 2 is a top plan of same;

Fig. 3 is a front elevation;

Fig. 4 is a detail sectional view;

Fig. 5 is a top plan of a modification of the driving means for the plows; and

Fig. 6 is a section through one of the blades 27, on line 6—6 of Fig. 3.

Like numerals designate like parts in each of the several views.

Referring to the accompanying drawing, I provide a suitable plow or scoop 7 having the upwardly flared sides 8, said scoop opening into a suitable discharge fan casing 6, shaped as shown in Fig. 3 and provided with opposite upwardly pointed lateral discharge openings 10 and with a central discharge passageway or opening 37.

The fan casing 6 and scoop 7 are suitably supported from the truck as by braces 38, and it is within the contemplation of my invention to make the scoop and fan casing vertically adjustable by any suitable conventional adjusting means. I provide suitable I-shaped fan blades 27 carried by the blade arms 26, the fan as a whole being mounted on shaft 11. I provide a plurality of rotary fans rotating in reverse directions to discharge the snow through the opposite lateral openings 10, the fan blades being offset relative to blades of the adjacent fan. I provide suitable gearing 40 connecting shaft 11 with shafts 39 which latter shafts are in turn connected by gearing 41 with shafts 42, which in turn are provided with gears 43, either one of which may be thrown into mesh with gear 44 by means of lever 24 which is adjustably engaged on lever segment 25. Gear 44 is mounted on engine shaft 45 and its operation may be regulated by a suitable clutch 46. I provide a suitable engine 49 for driving the snow plow. As shown in Fig. 6 fan blades 27 are attached to blade arms 26 by means of suitable bolts.

Referring to Fig. 5, I may provide sprocket chains 47 operatively connecting shafts 11 with sprocket shaft 48 which in turn are operatively geared to gear 44ª on shaft 45 and controlled by clutch 46.

The device may be applied to any motor driven trucks with either an independent or dependent power plant and provides an effective and inexpensive method of removing snow from the highways by dual fans which discharge snow from both sides of the machine in a manner that will be apparent from the accompanying drawing.

What I claim is:—

1. In a dual rotary snow plow adapted to plow through deep drifts, the combination of a scoop, dual semi-circular fan casings positioned to receive snow from the scoop, fan blades of suitable length to sweep in the respective casings, each of the casings having lateral passages opening out of the lower portion thereof and positioned and shaped to discharge snow upwardly and outwardly from the casings when the lowermost fan blades are rotating away from each other, the fan blades being positioned to overlap without contact, and means for driving the fans in a direction to throw the snow laterally and upwardly from the lateral discharge passages of the respective casings.

2. In a dual rotary snow plow, the combination of a plurality of relatively large rotary fan blades, said blades being positioned to overlap without contact, means for driving the fan blades in a direction to discharge the snow laterally and upwardly, a semi-circular casing encircling both fan blades and having opposite lateral passages extending upwardly from the lower portion of the fan casing, and having a central discharge opening, a scoop extending downwardly from the fan casing, and power operated means for connecting the fan blades to and driving them from a source of power.

3. In a dual rotary snow plow, the combination of a relatively deep plow scoop, a duplex fan casing having semi-circular casing members into which said scoop opens, a plurality of fans positioned so that the blades will overlap without contact, the fan casing having opposite outwardly and upwardly pointing passages opening out of the lower portion of the fan casing to discharge the snow when the lowermost fan blades are rotating away from each other, the fan casing also having a central opening, each of the fan blades being of I-shaped form in cross section, whereby to efficiently cut through a crust of ice on the surface of snow drifts, and power-operated means for driving the respective fans.

4. In a dual rotary snow plow, the combination of a duplex fan casing having semicircular casing members, a scoop opening into said casing, dual fans mounted in the casing, the casing having opposite laterally and upwardly extending discharge portions opening out of the bottom of the casing, the blades of the fan being of I-shaped form in cross section to effectively cut through crusts of ice on the surface of snow drifts and to prevent caking of the snow on the fan casing, substantially as described.

5. In a dual rotary snow plow, the combination of a duplex fan casing having semicircular casing members, a scoop opening into said casing, dual fans mounted in the casing, the casing having opposite laterally upwardly extending discharge portions opening out of the bottom of the casing, the casing also having a central vertical discharge channel, the blades of the fan being of I-shaped form in cross section to effectively cut through crusts of ice on the surface of snow drifts and to prevent caking of the snow on the fan casing, substantially as described.

6. In a dual rotary snow plow adapted to plow through deep drifts, the combination of a relatively deep snow scoop, relatively large dual fan casings positioned to receive snow from the scoop, relatively large fan blades of suitable length to sweep the respective casings, each of the casings having lateral passages opening out of the lower portion thereof and positioned and shaped to discharge snow upwardly and outwardly from the casings when the lowermost fan blades are rotating away from each other, the fan blades being positioned to overlap without contact, and means for driving the fans in a direction to discharge snow laterally and upwardly from the lateral discharge passages of the respective casings.

JOSEPH C. CHLADEK.